(12) United States Patent
Miette et al.

(10) Patent No.: US 10,688,531 B2
(45) Date of Patent: Jun. 23, 2020

(54) SHUTTLE TROLLEY HAVING A DECK STRUCTURED FOR SORTING NON-STANDARD PARCELS

(71) Applicant: SOLYSTIC, Bagneux (FR)

(72) Inventors: Emmanuel Miette, Saint Gratien (FR); Luc Chirol, Paris (FR)

(73) Assignee: SOLYSTIC (FR)

( * ) Notice: Subject to any disclaimer, the term of this patent is extended or adjusted under 35 U.S.C. 154(b) by 375 days.

(21) Appl. No.: 15/750,635

(22) PCT Filed: Nov. 20, 2017

(86) PCT No.: PCT/FR2017/053168
§ 371 (c)(1),
(2) Date: Feb. 6, 2018

(87) PCT Pub. No.: WO2018/115611
PCT Pub. Date: Jun. 28, 2018

(65) Prior Publication Data
US 2020/0086350 A1 Mar. 19, 2020

(30) Foreign Application Priority Data
Dec. 22, 2016 (FR) ..................... 16 63108

(51) Int. Cl.
*B07C 3/02* (2006.01)
*B62B 3/10* (2006.01)
*B60P 7/12* (2006.01)
(52) U.S. Cl.
CPC ................... *B07C 3/02* (2013.01); *B60P 7/12* (2013.01); *B62B 3/10* (2013.01); *B62B 3/102* (2013.01); *B62B 3/104* (2013.01); *B62B 3/108* (2013.01)

(58) Field of Classification Search
CPC .. B07C 3/02; B07C 5/36; B62B 3/104; B62B 3/102; B62B 3/108; B62B 3/10; B60P 7/12
See application file for complete search history.

(56) References Cited

U.S. PATENT DOCUMENTS

| | | | |
|---|---|---|---|
| 3,224,612 A * | 12/1965 | Olson | B62B 3/104 414/430 |
| 6,190,100 B1 | 2/2001 | Mawji | |
| 6,860,496 B2 * | 3/2005 | Novak | B62B 5/049 211/20 |
| 9,394,150 B2 * | 7/2016 | Bow | B66F 9/18 |
| 10,286,831 B2 * | 5/2019 | Gutierrez Lopez de Lara | B60P 7/0892 |

FOREIGN PATENT DOCUMENTS

| | | |
|---|---|---|
| FR | 2 268 575 A1 | 11/1975 |
| WO | 2007/100686 A2 | 9/2007 |
| WO | 2014/057182 A1 | 4/2014 |

* cited by examiner

*Primary Examiner* — Stephen T Gordon
(74) *Attorney, Agent, or Firm* — Ware, Fressola, Maguire & Barber LLP

(57) ABSTRACT

A shuttle trolley for a parcel-sorting logistics center, which trolley has a deck for carrying a non-standard parcel to be sorted, wherein the deck has a central portion in the shape of a trough of V-shaped cross-section, and two side portions on either side of the central portion and that both extend in the same horizontal plane.

1 Claim, 2 Drawing Sheets

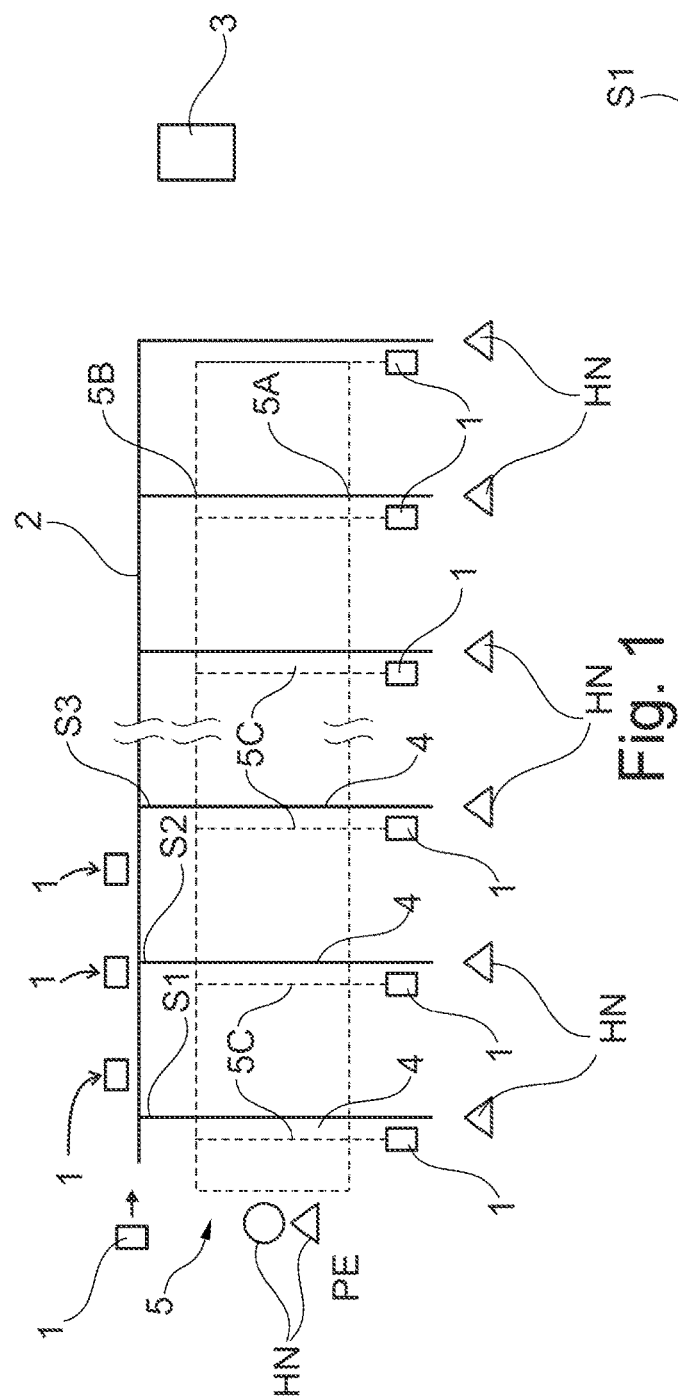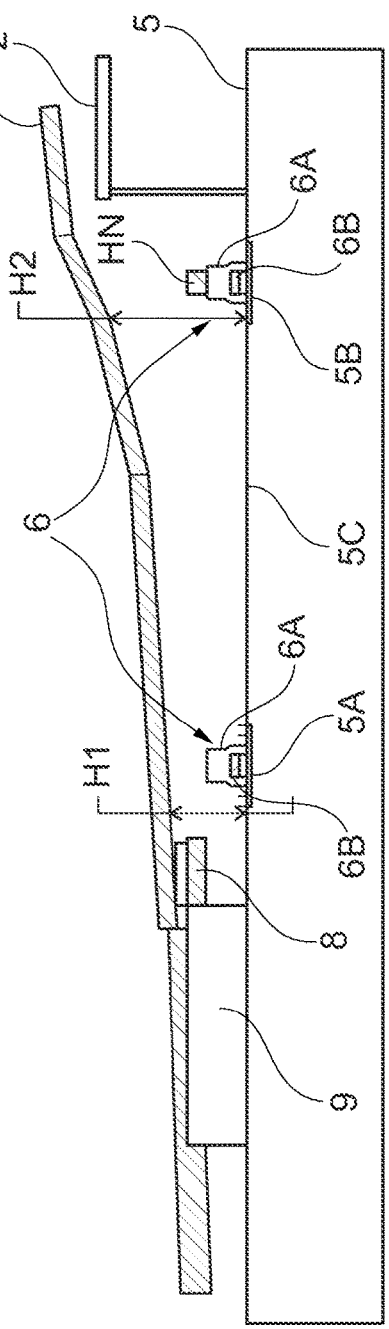

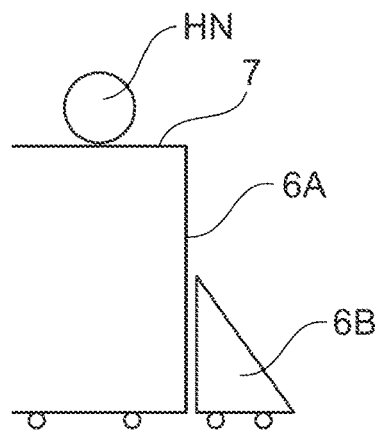
Fig. 3
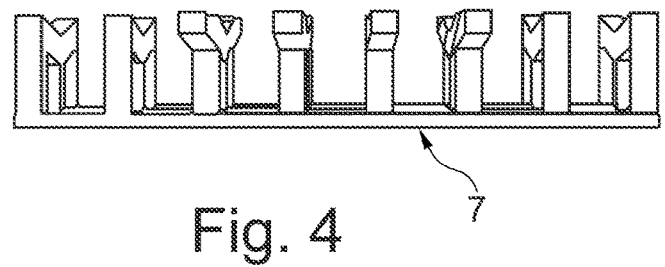
Fig. 4
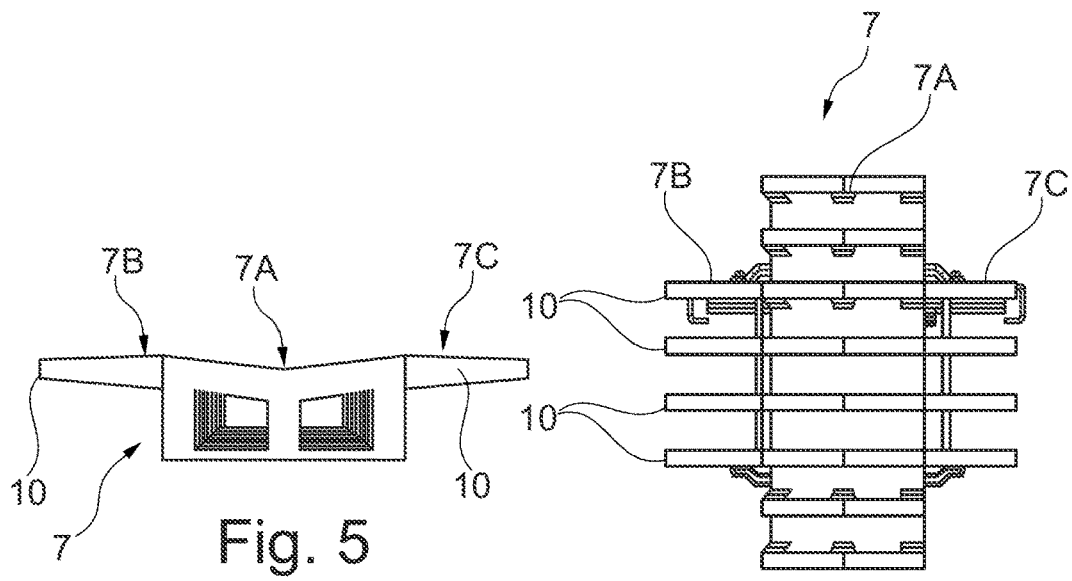
Fig. 5
Fig. 6

SHUTTLE TROLLEY HAVING A DECK STRUCTURED FOR SORTING NON-STANDARD PARCELS

CROSS REFERENCE TO RELATED APPLICATIONS

This application is the U.S. National Stage of International Application Number PCT/FR2017/053168 filed on Nov. 20, 2017, which application claims priority under 35 USC § 119 to French Patent Application No. 1663108 filed on Dec. 22, 2016. Both applications are hereby incorporated by reference in their entirety.

TECHNICAL FIELD

The invention relates to the field of parcel-handling logistics centers in which parcels are received, sorted, and consolidated into groups with a view to being delivered.

PRIOR ART

In particular, the invention relates to a shuttle trolley for a parcel-sorting logistics center, which trolley has a deck for carrying a parcel to be sorted. For example, such a shuttle trolley is known from Patent Document WO 2014/057182 for transporting parcels from a loading point to an unloading point.

Another type of shuttle trolley for transporting parcels is also described in U.S. Pat. No. 6,190,100.

The parcels transported by those shuttle trolleys are generally packets that are of various sizes but that are of generally rectangular block shape.

A delivery address for the parcel is placed on one face of the packet. For example, a digital image of said delivery address may be formed using a handheld scanner and it may be sent to the data processor unit for automatic recognition and for identifying an unloading point for the parcel, which unloading point corresponds to said delivery address in the automatic sorting process. A sorting code in the form of a bar code may also be placed on one face of the parcel.

But the range of parcels to be handled in such a sorting center is tending to widen, and parcels exist that have shapes and sizes very different from a rectangular block, such as, for example, a rug rolled up in the shape of a cylinder, or indeed a rigid slab of large dimensions, this list not being limiting.

In the above-indicated patent document, each of the shuttle trolleys has a deck adapted to carry a single parcel that is of generally rectangular block shape, and such a deck is not designed to carry, for example, a rug rolled up in the shape of a long cylinder.

SUMMARY OF THE INVENTION

An object of the invention is thus to propose a shuttle trolley having a structured deck that is better adapted to carrying a wide range of parcels of diverse shapes.

To this end, the invention provides a shuttle trolley for a parcel-sorting logistics center, which trolley has a deck for carrying a non-standard parcel to be sorted, the deck having a central portion in the shape of a trough of V-shaped cross-section, and two side portions on either side of the central portion and that both extend in the same horizontal plane, wherein the body of the deck comprises framework members forming two combs disposed back-to-back, the teeth of the combs extending parallel to one another from the central portion of the body to the edges of respective ones of the side portions.

BRIEF DESCRIPTION OF THE DRAWINGS

The present invention can be better understood and other advantages appear on reading the following detailed description of an embodiment given by way of non-limiting example and with reference to the accompanying drawings, in which:

FIG. 1 is a diagrammatic plan view of the platform of a parcel-sorting logistics center;

FIG. 2 is a diagrammatic section view of the platform of FIG. 1;

FIG. 3 shows a trolley mounted on wheels;

FIG. 4 is a diagrammatic side view of the deck of the trolley mounted on wheels;

FIG. 5 is a diagrammatic front view of the deck of the trolley mounted on wheels; and FIG. 6 is a diagrammatic plan view of the deck of the trolley mounted on wheels.

DESCRIPTION OF EMBODIMENTS

FIG. 1 is a highly diagrammatic view showing the topology of a logistics center for sorting parcels 1 with, in this example, a sorting conveyor 2 and sorting outlets, such as S1, S2, S3.

Only a small number of sorting outlets are shown even though the conveyor may serve several tens or indeed hundreds of sorting outlets.

The sorting conveyor may be a belt conveyor, a roller conveyor, or some other type of conveyor, and, in this example, it is fed with machine-sortable parcels from one of its ends (on the left of FIG. 1), on which conveyor the parcels 1 are moved in series and flat.

The sorting conveyor is controlled by a monitoring and control unit 3 adapted for automatically recognizing the recipient address of a parcel and, as a function of a sorting plan, for directing the parcel to the corresponding sorting outlet for sorting said parcel.

Automatic address recognition may be performed, for example, from a digital image of the recipient address on the parcel 1, which image is taken at the time the parcel 1 is fed onto the sorting conveyor 2.

As shown in FIGS. 1 and 2, the sorting conveyor 2 is, in this example, mounted at a height over the platform 5 of the logistics center, and each sorting outlet such as S1 is provided with a sorting chute 4 in the form of a ramp sloping downwards from the sorting outlet S1 of the sorting conveyor to the platform below the sorting conveyor.

The sorting equipment of the invention is designed to sort, at a reduced throughput rate, parcels that are not machine-sortable, that are referred to as "non-standard parcels" HN, and that are each shown in FIG. 1 by a triangle and a circle, unlike the machine-sortable parcels 1, which are each represented by a rectangle.

Said non-standard parcels HN are, for example, parcels that are of shape, weight, or dimensions incompatible with the operating characteristics of the conveyor 2. Such non-standard parcels may be cylinders, slabs, rolls, etc.

The non-standard parcels HN that reach the inlet point PE of the logistics center (on the left in FIG. 1) are, in this example, loaded one-by-one by an operative onto a shuttle trolley 6 mounted on wheels.

The recipient address of the non-standard parcel may be scanned by the operative and sent to the monitoring and control unit 3 for automatically determining a corresponding sorting outlet following a sorting plan for sorting the machine-sortable parcels.

Whereupon the monitoring and control unit is suitable for remotely controlling the shuttle trolley 6 loaded with the non-standard parcel HN so as to cause it to move on the platform 5 of the logistics center and so as to direct it towards the sorting outlet of the sorting conveyor that corresponds to said recipient address in the sorting plan for sorting the machine-sortable parcels.

As shown in FIGS. 1 and 2, the platform 5 of the logistics center has a first travel aisle 5A for the shuttle trolleys 6 that extends alongside the sorting conveyor 2 while passing under the sorting chutes 4, and a second travel aisle 5B for the shuttle trolleys 6 that is parallel to the first travel aisle 5A. As shown in FIG. 1, the travel aisles 5A, 5B pass under the sorting chutes substantially perpendicularly thereto.

The travel aisle 5B is disposed between the sorting conveyor 2 and the travel aisle 5A, under the sorting chutes, in such a manner that the travel aisle aA has less headroom H1 under the sorting outlet ramps than the travel aisle 5B, the headroom of the travel aisle 5B under the ramp being indicated by H2.

The monitoring and control unit 3 is arranged to cause the shuttle trolleys 6 to move along the travel aisles 5A and 5B between the loading point at the inlet PE of the logistics center, where a parcel is loaded onto an empty shuttle trolley, and a parcel unloading point, which, in this example, is at the free end of the sorting chute, where the parcel is unloaded from the shuttle trolley 6, which then returns empty to the loading point at the inlet PE.

More particularly, the movement of the shuttle trolleys 6 is controlled in such a manner that each shuttle robot 6 loaded with a non-standard parcel HN follows the travel aisle 5B where there is more headroom H2 under the ramp to reach the sorting chute, and in such a manner that the shuttle robot that returns empty follows the travel aisle 5A having less headroom H1 under the ramp to reach the loading point at the inlet PE.

As can be seen in FIG. 1, the two travel aisles are crossed by cross-aisles 5C followed both on the go routes and on the return routes by the shuttle trolleys 6, thereby allowing the shuttle trolleys to travel along optimized routes on the platform 5. FIG. 1 shows said cross-aisles 5C in dashed lines extending alongside the sorting chutes, but it should be considered that, in accordance with the invention, said cross-aisles 5C extend under the sorting chutes in order to optimize the footprint of the equipment.

By way of example, to go towards the sorting chute of the sorting outlet S3, the shuttle trolley follows the aisle 5B alongside the conveyor 2 to the outlet S3, and then turns through 90° and goes along and under the chute from the outlet S3 along the cross-aisle 5C to an unloading point at which the non-standard parcel is unloaded.

Then, the empty shuttle trolley 6 goes back up the cross-aisle 5C, and then turns through 90° to go back up the travel aisle 5A to the loading point PE where it can, once again, be loaded with a non-standard parcel HN.

This arrangement contributes to automating the sorting of non-standard parcels, while also optimizing the footprint occupied by the sorting equipment in the logistics center.

FIG. 2 is a longitudinal section view of FIG. 1, along a sorting chute.

The travel aisles 5A, 5B, and 5C are shown in FIG. 2.

FIG. 2 is a highly diagrammatic view of a shuttle trolley 6 placed on the travel aisle 5B and loaded with a non-standard parcel HN.

On the travel aisle 5A, another shuttle trolley 6 is shown without a non-standard parcel. A plurality of shuttle trolleys can travel at the same time along the travel aisles 5A, 5B, and 5C of the platform of the logistics center so as to increase the handling throughput rate of the non-standard parcels using the shuttle trolleys 6.

In this example, a shuttle trolley of the invention comprises a trolley mounted on wheels that is indicated by 6A in FIGS. 2 and 3 and that is provided with a deck 7 adapted to support a non-standard parcel HN, and a shuttle robot mounted on motor-driven wheels 6B that is adapted to move on the floor of the platform by being remotely controlled in wireless manner by the monitoring and control unit 5.

The shuttle robot is adapted to dock with the trolley mounted on wheels in such a manner as to move it on the platform 5 and also as to separate from said trolley mounted on wheels in such a manner as to leave it where it is.

The deck 7 of the shuttle trolley is shown in more detail in FIGS. 4 to 6.

In accordance with the invention, and as shown in these figures, the deck 7 has a structured shape designed to carry different non-standard parcels of different shapes: elongate cylinders or cylinders of large diameters, slabs, rectangular blocks, etc.

The deck 7 includes a central portion 7A in the shape of a trough of V-shaped cross-section and two side portions 7B, 7C on either side of the central portion and that both extend in the same horizontal plane.

The trough-shaped central portion 7A is adapted to carry cylindrical parcels. The two plane side portions 7B, 7C are adapted to carry flat parcels of large dimensions.

The trough of the central portion 7A is disposed below the horizontal plane of the side portions 7B, 7C so that a flat parcel of large size resting on the plane of the side portions straddles the trough of the central portion.

As can be seen more particularly in FIGS. 4 and 6, the bodies of the central and side portions 7A, 7B, 7C comprise framework members 10 forming two combs disposed back-to-back, the teeth of the combs extending parallel to one another from the central portion 7A to the edges of respective ones of the side portions 7B, 7C perpendicularly to the trough 7A.

The body of the central portion 7A may have a structure with holes through it as shown in FIG. 5.

As shown in FIGS. 4 and 5, the base of the body of the central portion 7A is offset vertically from the horizontal plane of the side portions 7B, 7C so as to enable automatic unloading to take place onto a roller conveyor 9 that feeds a storage bin 9 disposed at the end of the sorting chute 4 and also receiving the machine-sortable parcels 1 brought by said sorting chute 4.

In the storage bin 9, the machine-sortable parcels and the non-standard parcels are therefore consolidated so as to be loaded together onto the corresponding truck, thereby making it possible to rationalize the handling of the parcels at the outlet of the logistics center.

What is claimed is:

1. A shuttle trolley for a parcel-sorting logistics center, comprising:

a deck for carrying a non-standard parcel to be sorted, the deck having a central portion in the shape of a trough of V-shaped cross-section, and two side portions on either side of the central portion that both extend in a same plane same horizontal plane, wherein a body of the deck comprises framework members forming two combs disposed back-to-back, and wherein teeth of the combs extend parallel to one another from the central portion to edges of respective ones of the side portions.

* * * * *